(12) United States Patent
Pakhomov et al.

(10) Patent No.: US 6,535,849 B1
(45) Date of Patent: Mar. 18, 2003

(54) METHOD AND SYSTEM FOR GENERATING SEMI-LITERAL TRANSCRIPTS FOR SPEECH RECOGNITION SYSTEMS

(75) Inventors: Sergey S. Pakhomov, Minneapolis, MN (US); Michael J. Schonwetter, Minneapolis, MN (US)

(73) Assignee: ScanSoft, Inc., Peabody, MA (US)

( * ) Notice: Subject to any disclaimer, the term of this patent is extended or adjusted under 35 U.S.C. 154(b) by 0 days.

(21) Appl. No.: 09/487,398

(22) Filed: Jan. 18, 2000

(51) Int. Cl.⁷ ............................................... G10L 15/06
(52) U.S. Cl. ...................... 704/235; 704/270; 704/255
(58) Field of Search ............................... 704/255, 257, 704/260, 270, 235; 386/46

(56) References Cited

U.S. PATENT DOCUMENTS

| | | | | |
|---|---|---|---|---|
| 5,097,509 A | * | 3/1992 | Lennig | 381/43 |
| 5,509,104 A | * | 4/1996 | Lee et al. | 704/256 |
| 5,805,832 A | * | 9/1998 | Brown et al. | 395/752 |
| 5,839,105 A | * | 11/1998 | Ostendorf et al. | 704/256 |
| 5,884,256 A | * | 3/1999 | Bennett et al. | 704/235 |
| 5,949,952 A | * | 9/1999 | Bennett et al. | 386/46 |
| 6,023,675 A | * | 2/2000 | Bennett et al. | 704/235 |
| 6,112,172 A | * | 8/2000 | True et al. | 704/235 |
| 6,161,087 A | * | 12/2000 | Wightman et al. | 704/215 |
| 6,195,634 B1 | * | 2/2001 | Dudemaine et al. | 704/231 |
| 6,260,011 B1 | * | 7/2001 | Bennett et al. | 704/235 |
| 6,263,308 B1 | * | 7/2001 | Hackerman et al. | 704/231 |
| 6,272,461 B1 | * | 8/2001 | Meredith et al. | 704/235 |
| 6,278,973 B1 | * | 8/2001 | Chung et al. | 704/257 |
| 6,282,510 B1 | * | 8/2001 | Bennett et al. | 704/235 |

\* cited by examiner

*Primary Examiner*—Susan McFadden
(74) *Attorney, Agent, or Firm*—Bromberg & Sunstein LLP (57) ABSTRACT

A method for generating a semi-literal transcript from a partial transcript of recorded speech. The method includes augmenting the partial transcript with words from one of a filled pause model and a background model to build an augmented probabilistic finite state model for the partial transcript, inputting the recorded speech and the augmented probabilistic finite state model to a speech recognition system, and generating a hypothesized output for the recorded speech using the speech recognition system, whereby the hypothesized output may be used as the semi-literal transcript.

34 Claims, 10 Drawing Sheets

| 101 Line Number | 102 REFerence | 103 HYPothesis | 104 LABEL | 105 Acoustic Mod semi-literal transcription | 106 Lang. Mod.g semi-literal transcription |
|---|---|---|---|---|---|
| 1. | pedis | does | SUBSTITUION | pedis | pedis |
| 2. | TT_patient | TT_patient | MATCH | TT_patient | TT_patient |
| 3. | is | is | MATCH 112 | is | is |
| 4. | started | started | MATCH | started | started |
| 5. | on | on | MATCH | on | on |
| 6. | TT_lamisil | TT_lamisil | MATCH | TT_lamisil | TT_lamisil |
| 7. | two | two | MATCH | two | two |
| 8. | hundred | -- | DELETION | hundred | hundred |
| 9. | fifty | fifty | MATCH | fifty | fifty |
| 10. | TT_milligrams | TT_milligrams | MATCH 114 | TT_milligrams | TT_milligrams |
| 11. | a | a | MATCH | a | a |
| 12. | day | day | MATCH | day | day |
| 13. | TT_ive | TT_ive | MATCH | TT_ive | TT_ive |
| 14. | asked | asked | MATCH | asked | asked |
| 15. | that | that | MATCH | that | that |
| 16. | she | she | MATCH | she | she |
| 17. | be | be | MATCH | be | be |
| 18. | treated | treated | MATCH | treated | treated |
| 19. | for | for | MATCH | for | for |
| 20. | twelve | twelve | MATCH | twelve | twelve |
| 21. | weeks | weeks | MATCH 116 | weeks | weeks |
| 22. | -- | ah | INSERTION | ah | ah |
| 23. | -- | period | INSERTION | period | period |
| 24. | -- | ah | INSERTION | ah | ah |
| 25. | three | three | MATCH | three | three |
| 26. | -- | to | INSERTION | -- | to |
| 27. | -- | the | INSERTION | -- | the |
| 28. | plantar | plantar | MATCH 110 | plantar | plantar |
| 29. | warts | warts | MATCH | warts | warts |

METHOD AND SYSTEM FOR GENERATING SEMI-LITERAL TRANSCRIPTS FOR SPEECH RECOGNITION SYSTEMS

TECHNICAL FIELD

This invention relates to speech recognition methods and systems. More particularly, this invention relates to computerized methods and systems for generating semi-literal transcripts that may be used as source data for acoustic and language models for a speech recognition system and for other purposes where literal transcripts could be used.

BACKGROUND

Speech recognition systems, or speech recognizers, use recorded speech as an input and generate, or attempt to generate, a transcript of the spoken words in the speech recording. The recorded speech may come in a variety of forms; one common form for recorded speech is a digital recording that may be a mu-law encoded 8-bit audio digital signal.

Speech recognizers are commonly available. Speech recognizers use models of previous speech to assist in decoding a given utterance in a speech recording. One such commercial speech recognizer is the Truetalk product developed by Entropic Inc. This speech recognizer, which runs on a computer, in general comprises an experience base and pattern recognition code to drive the speech recognizer. The experience base contains important components of the speech recognizer, and may use a variety of models in speech recognition. The primary categories of models are acoustic models and language models.

The acoustic models of the speech recognizer may contain a set of models of sounds (sometimes called phonemes) and sound sequences (triphones). Each sound used in common speech may therefore be represented by a model within the acoustic models. For instance, the sounds "k," "ae" and "t" (which together form the word "cat") may be represented within the acoustic models. The acoustic models are used to assist in the recognition of the phonetic sequences that support the speech recognizer's selection of the most likely words of a given utterance, and the acoustic models use statistical representations to accomplish this task.

The language models may aid in determining the occurrence of words by applying known patterns of occurrences of words within speech. For instance, the language model may be able to determine the words from the context or from patterns of occurrence of certain words in spoken language.

The Truetalk speech recognizer contains three interconnected modules within the experience base: a set of acoustic models, a language model, and a pronunciation dictionary. The three modules function together to recognize words in spoken speech. The pronunciation dictionary may be a set of models that is capable of combining the sounds within the acoustic models to form words. For example, the pronunciation dictionary may include models that can combine the "k," "ae" and "t" sounds from the acoustic models to form the word "cat." Although the speech recognizer described herein will be described with reference to the English language, the modules may be adapted to perform word recognition for other languages.

Commercial speech recognizers generally come with generic versions of the experience base. Some of these speech recognizers, such as the Truetalk product by Entropic, Inc., allow the user to train, modify and add to the models. The models, for instance, may be modified so that filled pause "words," such as "um" or "ah," are represented in the data used to train the models and so that patterns of occurrence are modeled for these "words." A large number of words (on the order of between 2 million and 500 million) may be used to train the language model and the acoustic models. The models may be person-specific, such as for specific users with different accents or grammatical patterns, or specific to certain contexts, such as the medical field. If the models are limited by person or context, the models may require less training to determine patterns of occurrence of words in speech. The models, however, need not be person or context specific. The significant point is that the models, and in particular the acoustic models and language models, may be trained or modified so that they perform better to recognize speech for a given speaker or context.

Literal transcripts have traditionally been used to train and modify acoustic models and language models. The literal transcript and the recorded speech are submitted to software that generates an acoustic model or language model or that modifies a given acoustic model or language model for transcribed words. This software is well established and commonly used by those skilled in the art. One problem with this method of producing acoustic models or language models, however, is that a literal transcript must be generated for use in building the model. A "literal transcript" of recorded speech, as used in this specification, means a transcript that includes all spoken words or utterances in the recorded speech, including filled pause words (such as "um" and "ah"), repair instructions in dictated speech (such as "go left, no, I mean go right"), grammatical errors, and any pleasantries and asides dictated for the benefit of the human transcriptionist (such as "end of dictation; thank you," or "new paragraph"). Such literal transcripts are generated by human transcriptionists, which is a labor intensive and expensive task, especially when the end product of a literal transcript is not the desired output in the transcription business.

The commercial transcription business produces partial transcripts as the desired output. These partial transcripts typically remove filled pause words, repairs, pleasantries and asides, and grammatical errors. A "partial transcript," as used throughout this specification, is what the dictator of the speech desires for the outcome, rather than a literal transcript of the dictated speech. It is, in other words, what the human transcriptionist generates from recorded speech, which typically includes correcting grammatical errors, repetitive speech, partial sentences, and other speech that should not be included in a commercial transcript. Unlike literal transcripts, which have no real commercial value, partial transcripts are the desired end product of the transcription business. Although partial transcripts are commonly generated in the transcription business, unlike literal transcripts, they miss and alter much of the spoken speech in a recording and are therefore commonly of limited value as a data source for building or modifying the models of a speech recognizer.

A need exists for a method and system that can use commonly available partial transcripts of recorded speech to develop or modify the models of a speech recognizer.

SUMMARY

One embodiment of the invention is a method for generating a semi-literal transcript from a partial transcript of recorded speech. In this embodiment, the method includes augmenting the partial transcript with words from one of a filled pause model and a background model to build an augmented probabilistic finite state model for the partial transcript, inputting the recorded speech and the augmented probabilistic finite state model to a speech recognition system, and generating a hypothesized output for the recorded speech using the speech recognition system, whereby the hypothesized output may be used as the semi-literal transcript. In another embodiment, the method may further include integrating the hypothesized output with the partial transcript to generate the semi-literal transcript of the recorded speech.

In another embodiment of a method for generating a semi-literal transcript from a partial transcript of recorded speech, the invention comprises augmenting the partial transcript with words from a filled pause model and a background model to build an augmented probabilistic finite state model for the partial transcript, inputting the recorded speech and the augmented probabilistic finite state model to a speech recognition system, generating a hypothesized output for the recorded speech using the speech recognition system, and integrating the hypothesized output with the partial transcript to generate a semi-literal transcript of the recorded speech.

In another embodiment, the invention is a method for using a partial transcript in a speech recognition system. This embodiment of the invention comprises augmenting the partial transcript of recorded speech with words from a filled pause model and a background model to build an augmented probabilistic finite state model for the partial transcript, inputting the recorded speech and the augmented probabilistic finite state model to a speech recognition system, generating a hypothesized output for the recorded speech using the speech recognition system, integrating the hypothesized output with the partial transcript to generate a semi-literal transcript of the recorded speech, and using the semi-literal transcript as a substitute for a literal transcript of the recorded speech.

The above embodiments of the invention have a number of advantages over the prior art. The invention may allow for adaptation of the models of a speech recognizer without having to generate literal transcripts of recorded speech. Instead, a partial transcript, which may be generated for commercial purposes anyway, may be used for modeling purposes. The use of partial transcripts for the generation of semi-literal transcripts may save significant amounts of time and money which may have been spent constructing literal transcripts.

In another embodiment, the invention is a method for using a partial transcript of recorded speech. In this embodiment, the invention comprises producing a semi-literal transcript from the partial transcript using speech recognition technology and augmentation of a speech model derived from the partial transcript, and using the semi-literal transcript as a substitute for a literal transcript of the recorded speech. This embodiment of the invention provides the advantages over the prior art of using partial transcripts for the creation of semi-literal transcripts, which may have numerous uses in speech recognition applications.

In yet another embodiment, the invention is an apparatus for generating a semi-literal transcript from a partial transcript of recorded speech. In this embodiment, the invention comprises an interpolator containing programs for augmenting the partial transcript with words from one of a filled pause model and a background model to build an augmented probabilistic finite state model for the partial transcript, a speech recognizer containing programs for generating a hypothesized output for the recorded speech using the augmented probabilistic finite state model and the recorded speech as inputs, and an integrator containing instructions for integrating the hypothesized output with the partial transcript to generate a semi-literal transcript of the recorded speech. Like the above embodiments of the invention, this embodiment allows for the adaptation of the models of a speech recognizer without having to generate literal transcripts of recorded speech.

Other features and advantages of the present invention will become more fully apparent and understood with reference to the following description and drawings, and the appended claims.

DETAILED DESCRIPTION a. General Overview

Figure 1:
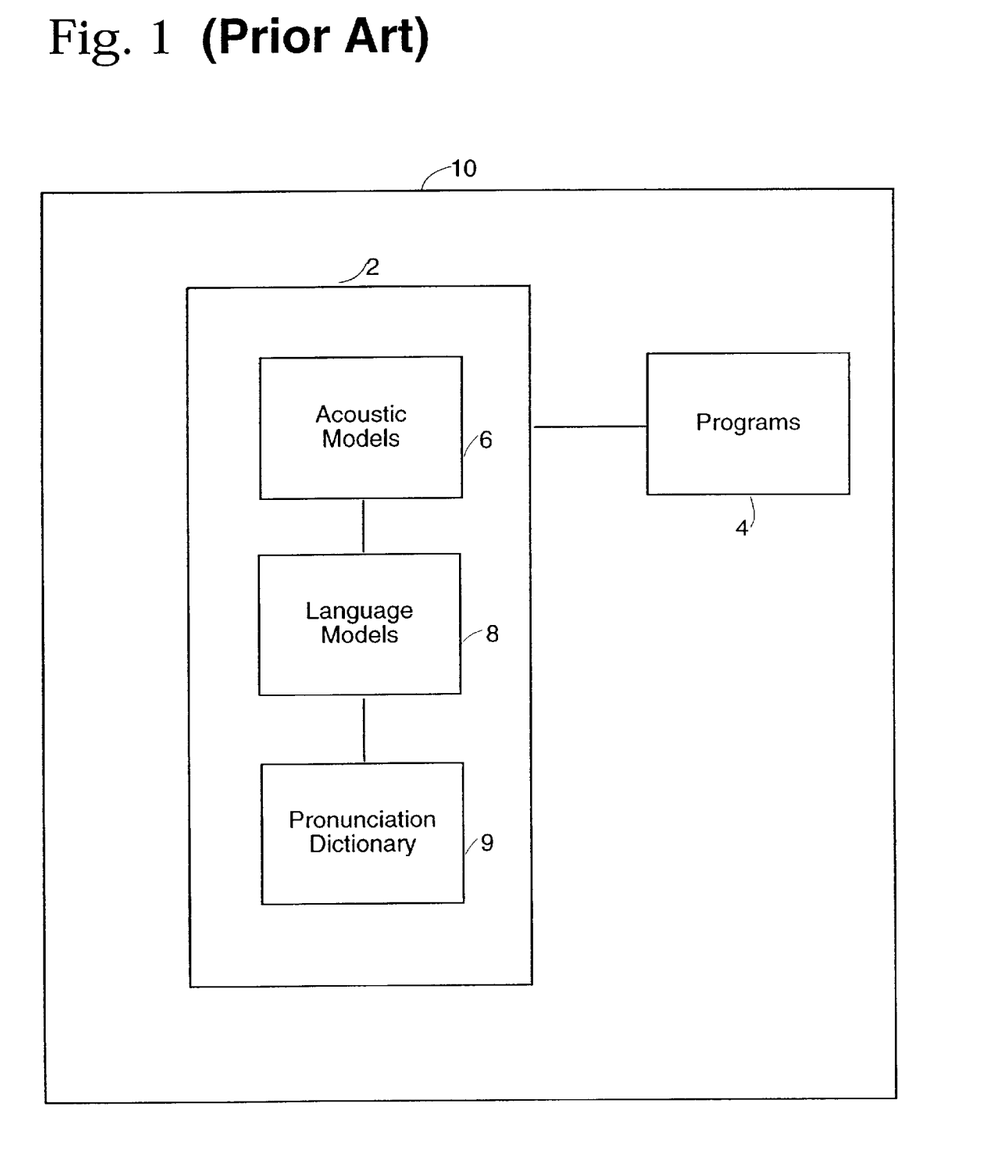
FIG. 1 is a block diagram overview of a typical speech recognition system.

FIG. 1 depicts a speech recognizer 10 as is commonly used by those skilled in the art. As described above, a speech recognizer 10 may comprise an experience base 2 and software 4 (or pattern recognition code) to drive the speech recognizer 10. The experience base 2 may contain a set of acoustic models 6, language models 8, and pronunciation dictionaries 9. Any speech recognizer 10 known to those skilled in the art may be used within the scope of the invention. As stated above, speech recognizers 10 commonly allow the models that form the experience base 2 to be modified or adapted through further training. In one embodiment, a speech recognizer 10 developed by Entropic Inc. may be used, although other speech recognizers known to those skilled in the art may be used in other embodiments of the invention.

Figure 2:
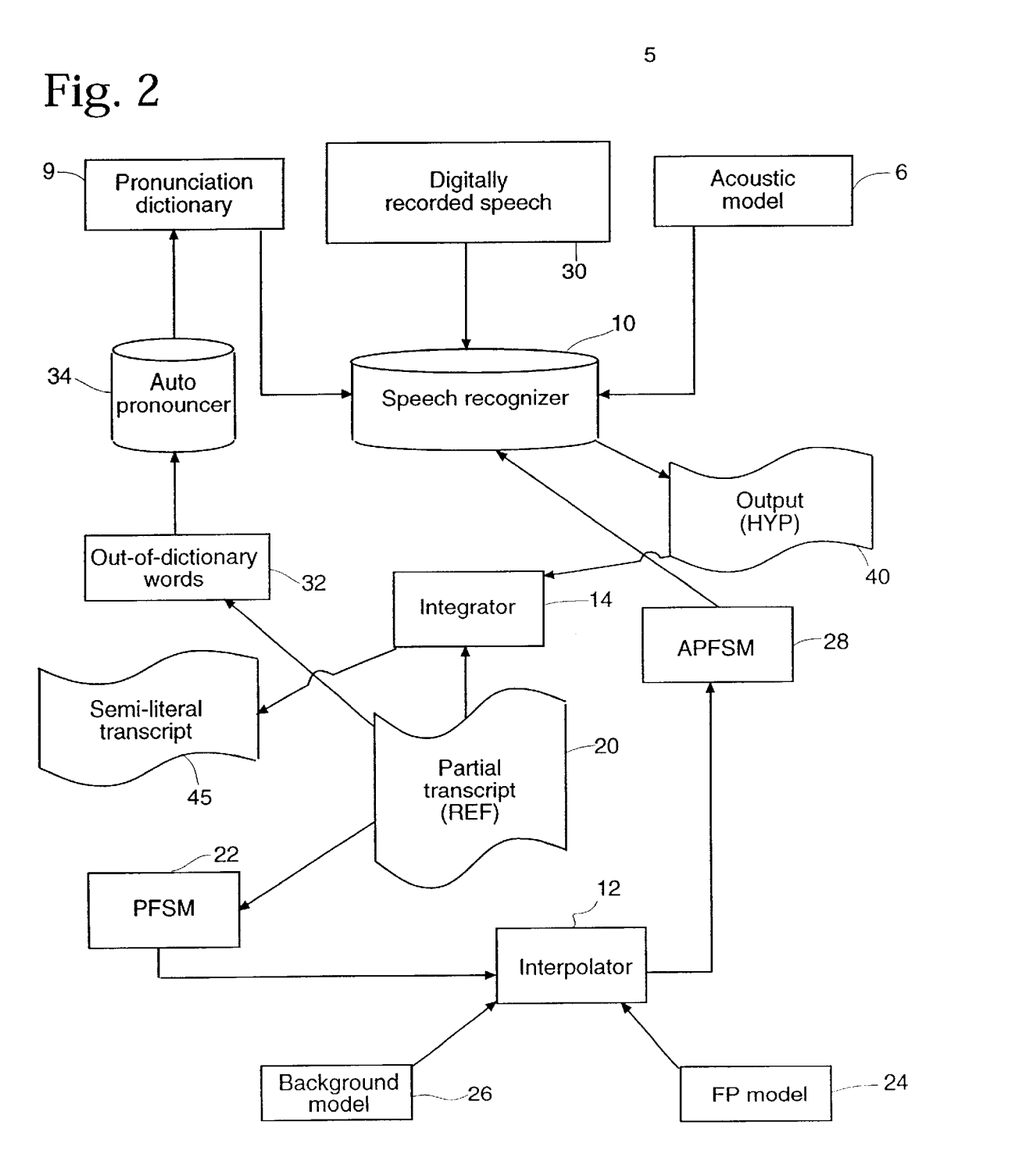
FIG. 2 is a block diagram showing one embodiment of the system and method of the invention.

One embodiment of the system for generating a semi-literal transcript 5 (the "system 5") of the present invention is shown in a general block-diagram form in FIG. 2. A "semi-literal transcript," as used throughout this specification, means a transcript that is similar to a literal transcript of recorded speech, but is not verified entirely by a human transcriptionist. In general, the system 5 contains an interpolator 12, a speech recognizer 10, and an integrator 14. These components of the invention may function in computers as programs or software, such as that depicted as programs 4 in FIG. 1. The functions described throughout the remainder of this application, therefore, may function in programs or software in computer hardware to carry out the invention. In one embodiment, all of the modules (e.g., the interpolator 12, speech recognizer 10, and integrator 14) of the invention may be contained within a single program or software package on a computer. In other embodiments, separate programs or software packages may contain these modules, and the modules may exist on separate computers or computer systems that are networked together.

Figure 3:
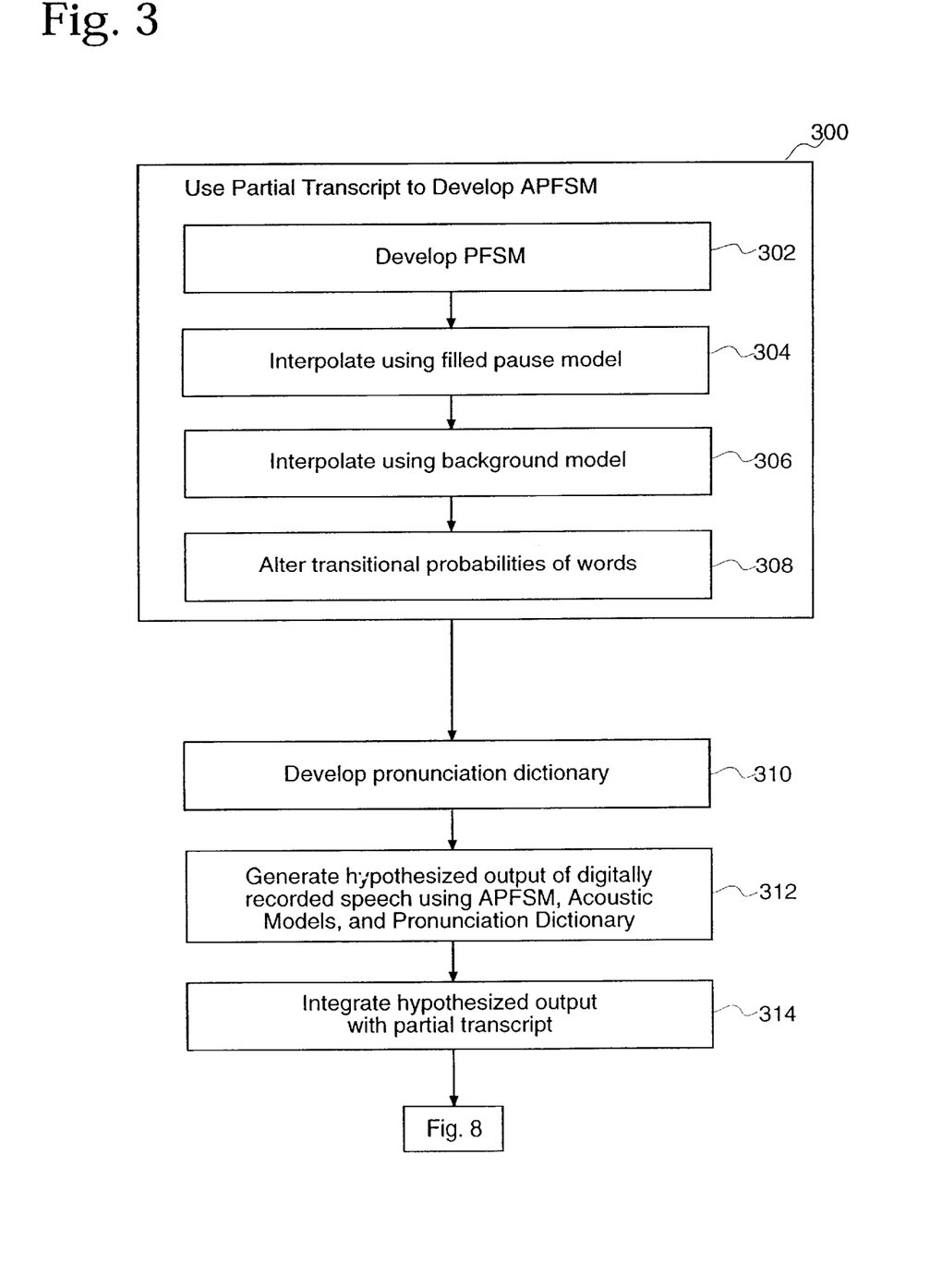
FIG. 3 is a flow chart showing the operation of one embodiment of the invention.

FIGS. 2–6 and 8 depict flow diagrams that show the operation of the present invention in several embodiments. In one embodiment of the invention as shown in FIG. 2, the invention takes a partial transcript (REF) 20 of recorded speech and develops a probabilistic finite state model (PFSM) 22 for the partial transcript 20. This probabilistic finite state model 22 may then be used, along with an interpolator 12, to develop an augmented probabilistic finite state model (APFSM) 28 for the words in the partial transcript 20 (numeral 300 in FIG. 3) using either a filled pause model 24 or a background model 26, or both a filled pause model 24 and a background model 26. FIG. 3 depicts acts of interpolating using a filled pause model 304 and interpolating using a background model 306. Probabilities from the filled pause model 24 and background model 26 may be used to alter the transitional probabilities of the occurrence of a word after the current word in the partial transcript 20, as denoted by numeral 308 in FIG. 3. The partial transcript 20 may also be used to develop a pronunciation dictionary 9 (numeral 310 in FIG. 3) that may be used by the speech recognizer 10 during speech recognition.

Referring again to FIG. 2, the augmented probabilistic finite state model 28 may be used during speech recognition to assist in the generation of a hypothesized output (HYP) 40 for the recorded speech (numeral 312 in FIG. 3) that, presumably, will contain some of the filled pauses and background words. Throughout this specification, the term "hypothesized output" will be used to refer to a form of a transcript that may contain filled pauses and/or background words. This hypothesized output 40 may then be compared and integrated with the partial transcript 20 in an integrator 14 to produce a semi-literal transcript 45 of the recorded speech (denoted by numeral 314 in FIG. 3 and set forth in greater detail in FIG. 8). Such a semi-literal transcript 45, which may contain filled pauses and background words and should therefore be similar to a literal transcript of the recorded speech, may then be used for any application in which a literal transcript is commonly used. The following sections set forth the functions of the components of an embodiment of the invention in further detail.

b. The Interpolator

As shown in FIG. 2, one embodiment of the invention contains an interpolator 12. The purpose of the interpolator 12, in general, is to augment the model of the partial transcript 20 with words from a filled pause model 24 and a background model 26 to build an augmented probabilistic finite state model 28 of the partial transcript 20. The interpolator 12 may simply be software modules or programs that carry out one or more of the acts below to create an augmented probabilistic finite state model 28 from the partial transcript 20. The word "augment" will be used in this specification to refer to an act of building a model that includes filled pauses or background words, or filled pauses and background words, along with words from a partial transcript.

Figure 4:
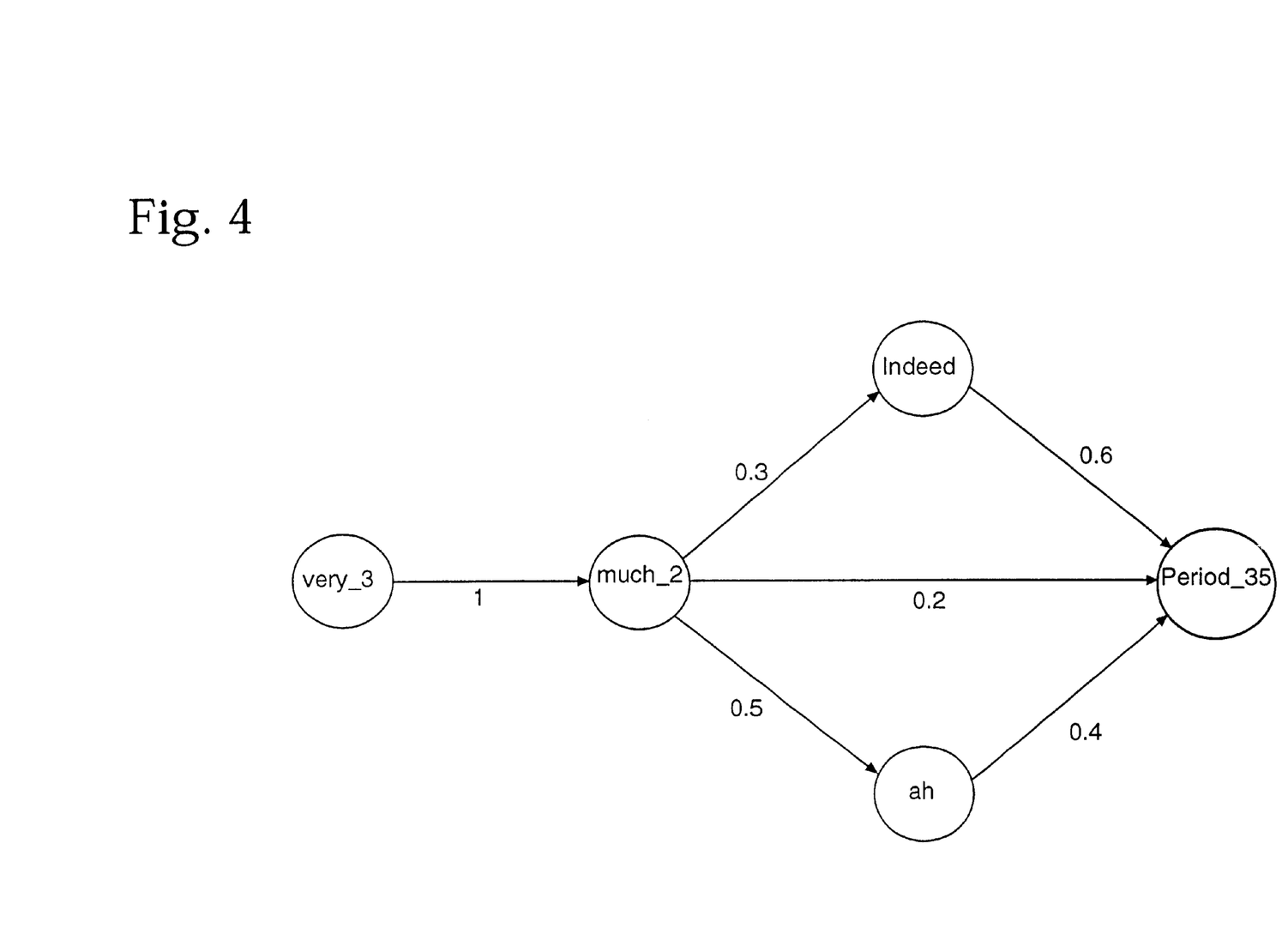
FIG. 4 is one example of an augmented probabilistic finite state model generated in accordance with one embodiment of the invention.

FIG. 4 depicts one possible augmented probabilistic finite state model 28 for a portion of the partial transcript 20 containing the words "very", "much", and "period" in succession. Initially, any process known to those skilled in the art may be used to generate a finite state model for the partial transcript 20. Using such a process, probabilities may be assigned to the occurrence of a word following a current word or a current string of words. Although a variety of such methods may be used, suitable methods are disclosed in U.S. Pat. No. 4,489,435 to Moshier, U.S. Pat. No. 4,530,110 to Nojiri et al., and U.S. Pat. No. 4,831,550 to Katz (the "Katz" patent). The Katz patent describes a formula used to assign probabilities for the occurrence of words in context and variations of this formula are commonly used by those skilled in the art. Although the method of the Katz patent may be used in one embodiment of the present invention, any other method known to those skilled in the art or disclosed herein may be used to assign a probability (for a probabilistic model) to the occurrence of a word in the context of other words. Such a method may use a stochastic approach, although a rule-based approach may be used in another embodiment, and such a method may consider current words or strings of words in isolation or in the context of part or all of the partial transcript 20.

In another embodiment, it may be initially assumed that each word in the partial transcript 20 directly follows the previous word in the partial transcript 20. For example, in FIG. 4, the word "period" follows the word "much", which in turn follows the word "very". It may be initially assumed, for a probabilistic finite state model, that there is a 100% probability that "period" follows "much" and a 100% probability that "much" follows "very". The transitional probability assigned after the current word in the partial transcript 20 may then be determined by altering the probability of the next word following the current word for those words that are found in the filled pause model 24 or the background model 26, or in both the filled pause model 24 and the background model 26. This process results in the augmented probabilistic finite state model 28 shown in FIG. 4.

The filled pause model 24, which is described in more detail below, augments the partial transcript 20 by adding words such as "um" and "ah". These words, referred to throughout this specification as "filled pause words" or "filled pauses," are words that are commonly spoken during speech, but are edited out of recorded speech during transcription because the desired transcript typically should not contain these words. The background model 26, which is also described in more detail below, augments the partial transcript 20 by adding words such as "end of dictation", "thank you", "indeed", or "new paragraph". These words, referred to throughout this specification as "background words," are words that are commonly spoken to provide background or aid to the person transcribing recorded speech. Such expressions may include, but are not limited to, pauses, repairs, false starts, repetitions, pleasantries, and asides.

To build the augmented probabilistic finite state model 28 of FIG. 4, the following procedure may be followed in one embodiment. If a word in the partial transcript 20 is not found in either the filled pause model 24 or the background model 26, the transitional probability of 100% is left unaltered so that, in the model 28, there is a probability of 100% (or 1) that the next word will be the next word in the partial transcript 20. For instance, in the example of FIG. 4, the word "very" is not found in the filled pause model 24 or background model 26, so the transitional probability of 100% (or 1) is not augmented. If, on the other hand, a word in the partial transcript 20 is found in either the filled pause model 24 or background model 26, the transitional probability following that word is altered according to the frequency determined by the filled pause model 24 or the background model 26. For example, in the example of FIG. 4, the word "much" is found in the filled pause model 24, which indicates that there is a 50% (or 0.5) probability that the filled pause word "ah" may follow the word "much". In addition, the word "much" is found in the background model 26, which indicates that there is a 30% (or 0.3) probability that the background word "indeed" may follow the word "much". Because a 20% (or 0.2) probability remains after augmentation by the filled pause model 24 and background model 26, a 20% (or 0.2) probability remains that the word following "much" may be "period". FIG. 4 depicts one small string of words and exemplary probabilities. The process described herein and depicted in FIG. 4 may, however, be used to build an augmented probabilistic finite state model 28 for the entire partial transcript 20.

Described above is a simplified analysis of generating probabilities for the augmented probabilistic finite state model 28 based on filled pause models 24 and background models 26. A number of filled pause words or background words could be inserted into an augmented probabilistic finite state model 28 if determined as such from the filled pause model 24 and background model 26. For example, a probability could be associated with the string "um, ah", or one probability could be assigned to "um" and a second probability assigned to "ah". In addition, other probabilistic finite state models could be used in association with the filled pause model 24 and the background model 26 of the present invention.

FIG. 4 also depicts "tokens" for each word in the partial transcript 20. The "3" that follows "very", the "2" that follows "much", and the "35" that follows "period" are tokens in FIG. 4. These tokens represent the number of times that the word has occurred in the entire partial transcript 20—FIG. 4 shows the third occurrence of the word "very", the second occurrence of the word "much", and the thirty-fifth occurrence of the word "period". The tokens may be used by some processes for determining the probability of words that may follow the current word in the partial transcript 20. For instance, certain models may assign different probabilities for the occurrence of a word following the current word based on the token of the current word. Because the words "indeed" and "ah" are not found in the partial transcript 20, but are instead augmented by the background model 26 and filled pause model 24, these words are not tokenized in FIG. 4. Throughout this specification, "tokenized word" will be used to refer to a word that is found in the partial transcript 20.

1. The Filled Pause Model

Figure 5:
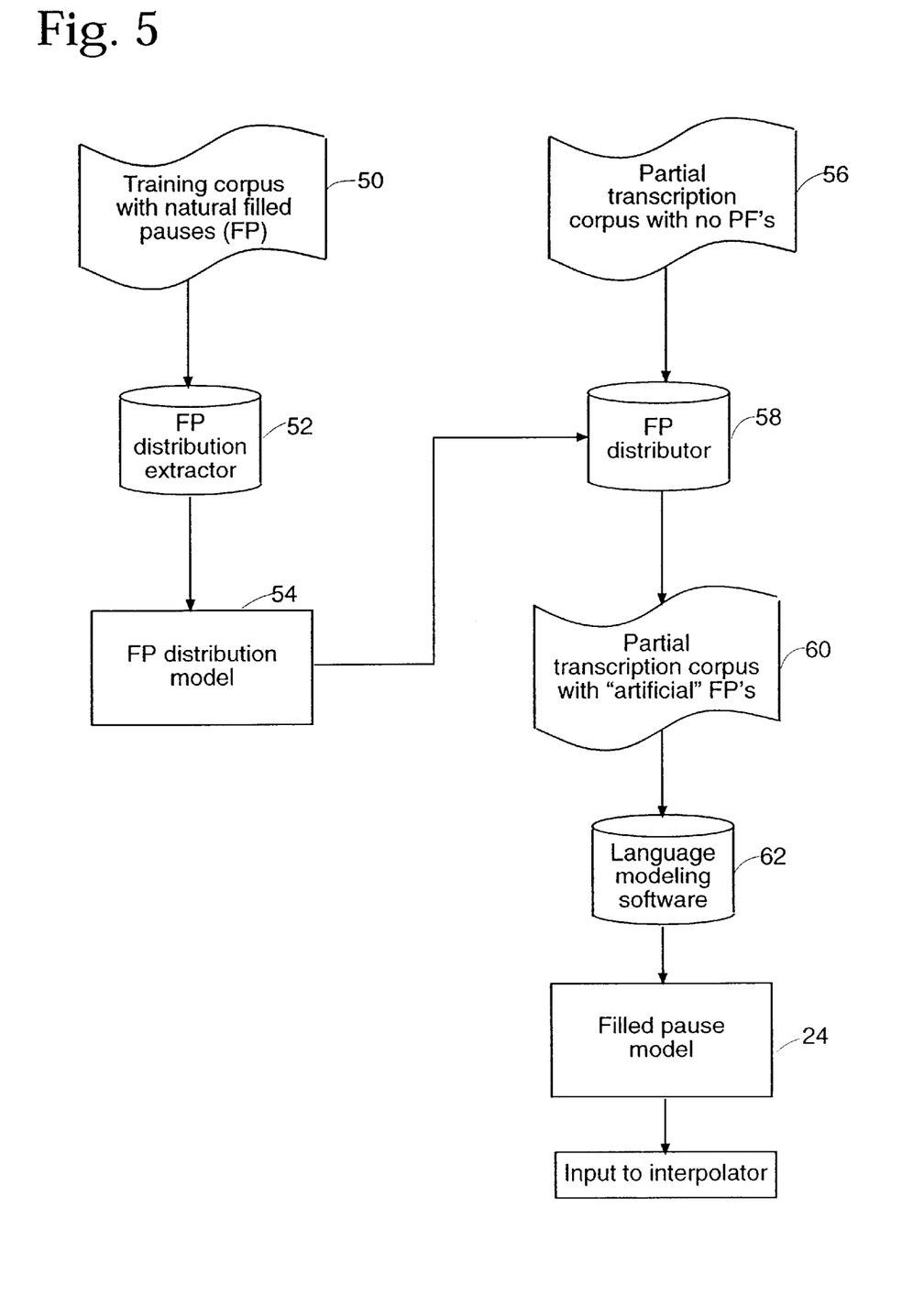
FIG. 5 is a flow chart showing one embodiment of the creation of a filled pause model.

Any variety of filled pause models 24 may be used within the scope of the invention. In general, the filled pause model 24 contains words matched with probabilities of transitions to filled pause words. The filled pause model 24 may use a filled pause distribution model that may be any stochastic or rule-based model that may distribute filled pauses. FIG. 5 is a flow chart depicting one embodiment of the creation of a filled pause model 24 that may be used in the interpolator 12 of FIG. 2, although other embodiments known to those skilled in the art may also be used within the scope of the invention. In the embodiment of FIG. 5, a training corpus 50 containing filled pauses may be used to develop a filled pause distribution model 54. A filled pause extractor 52 may analyze the training corpus 50, which may be a literal transcript of recorded speech, and, based on the occurrence of filled pause words, build the filled pause distribution model 54.

Referring to FIG. 5, a partial transcript of speech 56, which typically will not contain filled pauses, may then be populated with filled pauses by a filled pause distributor 58 that uses the filled pause distribution model 54. The filled pause distribution model 54 may be created by extracting filled pause distribution information from a relatively small corpus of literal transcripts according to the following formulas:

$$P(FP|W-1)=N(W-1\ FP)/N(W-1);$$

$$P(FP|W+1)=N(FP\ W+1)/N(W+1);$$

where $P(FP|W-1)$ stands for the conditional probability of a filled pause occurring after a word $W-1$, or to the left of the current word in standard written text; $P(FP|W+1)$ stands for the conditional probability of a filled pause occurring before a word $W+1$, or to the right of the current word in standard written text; $N(W-1\ FP)$ represents the number of $W-1$ FP bigrams, or the number of filled pause words preceding the current word; $N(FP\ W+1)$ represents the number of FP $W+1$ bigrams, or the number of filled pause words following the current word; $N(W-1)$ is the number of words $W-1$ proceeding the current word; and $N(W+1)$ is the number of words $W+1$ following the current word. The resulting probabilistic model describes the likelihood of filled pauses occurring in $W-1$, $W+1$ contexts and can be used to populate a corpus of partial transcripts 60 with filled pauses. See Pakhomov, S., "Modeling Filled Pauses in Medical Dictations," *In Proceeding ACL* 1999, p. 619–24, for a discussion on filled pause models. Other methods of determining filled pause distribution can also be used within the scope of the invention. For example, filled pauses can be distributed in the corpus of partial transcripts 60 uniformly or exponentially. The filled pause distributor 58 may therefore create a partial transcript corpus containing "artificial" inserted filled pauses 60, and the partial transcript corpus containing inserted filled pauses 60 may then be modified with language modeling software 62 to create the filled pause model 24 that may be used by the interpolator 12.

2. The Background Model

Figure 6:
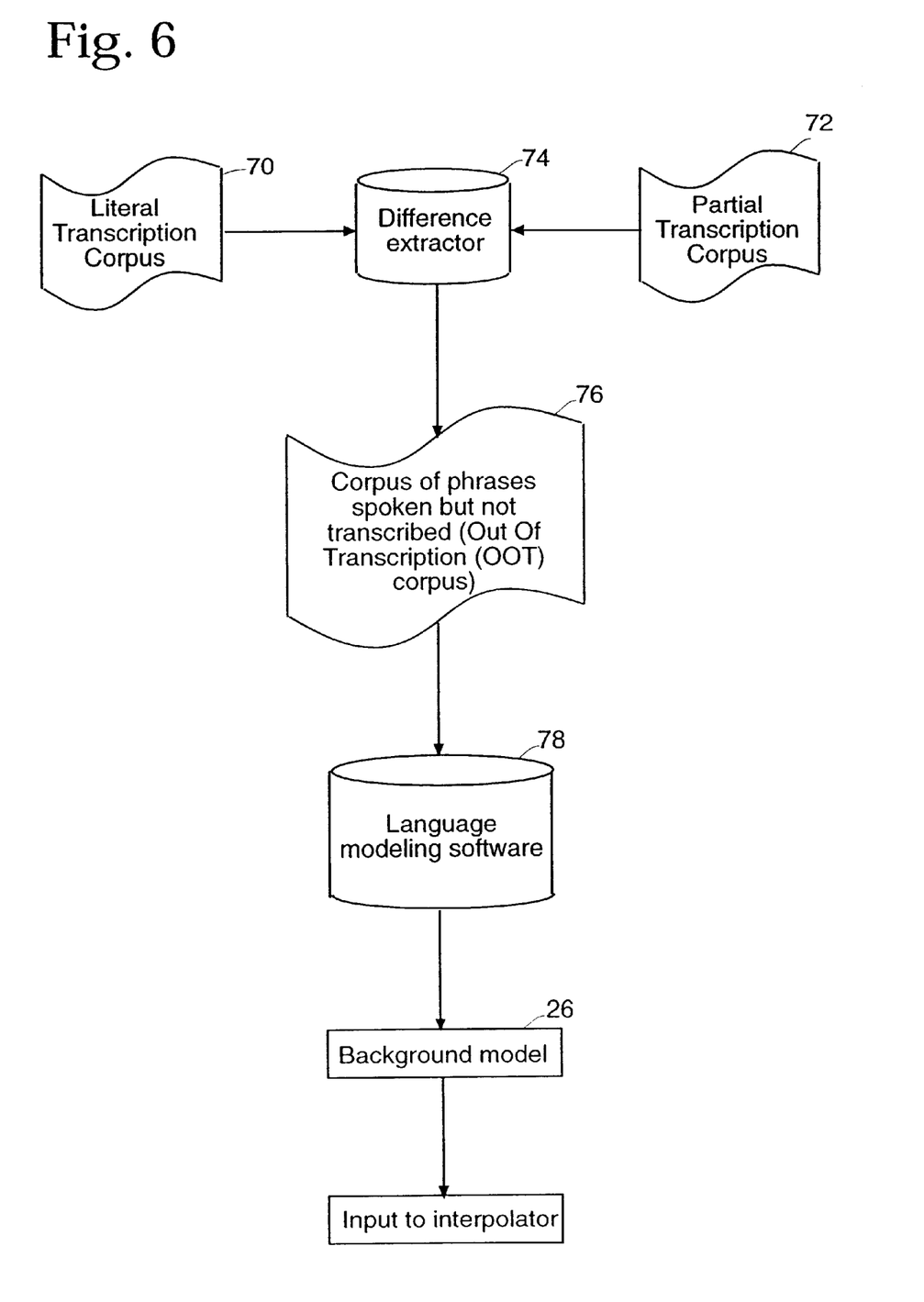
FIG. 6 is a flow chart showing one embodiment of the creation of a background model.

Any variety of background models 26 may be used within the scope of the invention. In general, the background model 26 contains words matched with probabilities of transitions to background words. The background model 26 may be created by any method known to those skilled in the art, including the use of rule-based models or stochastic models. FIG. 6 is a flow chart depicting one embodiment of the creation of a background model 26 that may be used in the interpolator 12 of FIG. 2, although other embodiments known to those skilled in the art may also be used within the scope of the invention. In the embodiment of FIG. 6, a literal transcript corpus 70, which contains background words, may be input to a difference extractor 74 along with a partial transcript corpus 72, which does not contain the background words because a human transcriptionist has edited the corpus 72 to remove background words.

The difference extractor 74 of FIG. 6 may compare the literal transcript corpus 70 with the partial transcript corpus 72 and generate a corpus of words or phrases 76 that were spoken (i.e., contained in the literal transcript corpus 70) but not transcribed (i.e., not contained in the partial transcript corpus 72). The corpus of words or phrases 76 may also contain probabilities of the occurrence of background words after spoken words in the partial transcript corpus 72. The corpus of words or phrases 76 may be adapted by language modeling software 78 to further refine the distribution model of background words to produce the background model 26 that may be used by the interpolator 12.

c. The Speech Recognizer

The speech recognizer 10 of the present invention may, in one embodiment, contain the models shown in FIG. 1. FIG. 2 depicts an acoustic model 6, a pronunciation dictionary 9, and an augmented probabilistic finite state model 28 as models used within the speech recognizer 10. The augmented probabilistic finite state model 28, in one embodiment, may function much like a language model within the speech recognizer 10. In other words, although the content of the augmented probabilistic finite state model 28 may differ from a typical language model, the format of the augmented probabilistic finite state model 28 may be in a form similar to a typical language model so that it may be used in the speech recognizer 10. In general, the purpose of the speech recognizer 10 is to input the recorded speech 30 and to generate a hypothesized output 40 of the recorded speech 30 using the augmented probabilistic finite state model 28 as a model for the speech recognizer 10.

In one embodiment, the pronunciation dictionary 9 of the speech recognizer 10 may be formed, at least partially, using the partial transcript 20, as depicted in FIG. 2. The pronunciation dictionary 9 may be adapted to include a list of words found in the partial transcript 20 combined with the phonetic representations of these words. The phonetic representations may, in one embodiment, be taken from a dictionary 32 of pronunciations of words. In addition, the phonetic representations may be generated by an automatic pronunciation generator 34. Such an automatic pronunciation generator 34 may use any grapheme (written) to phoneme (sound) process or system known to those skilled in the art to generate phonetic representations of words from the written text of those words. The process or system may extrapolate from empirical data used for phonetic representations or it may be rule-based. One suitable pronunciation generator may be the Festival System from the University of Edinburgh, although other pronunciation generators, including those constructed for specific applications, may also be used. A pronunciation dictionary 9 adapted in this way by using the partial transcript 20 may allow the speech recognizer 10 to better recognize certain words in the recorded speech 30.

The speech recognizer 10 of FIG. 2 generates a hypothesized output 40 of the recorded speech 30. In addition to the words in the partial transcript 20, this hypothesized output 40 may contain filled pauses and background words, and may be the speech recognizer's 10 best estimate of a literal transcript of the recorded speech 30. In one embodiment, the speech recognizer 10 may determine the wave form of the recorded speech 30 by making an approximation based on the acoustic model 6, and then determine which word the wave form is likely to be based on the probabilities in the augmented probabilistic finite state model 28, the wave form from the acoustic model 6, and the information in the pronunciation dictionary 9. Although FIG. 2 depicts one embodiment of the models used in the speech recognizer 10, any variety of models may be used by the speech recognizer 10, and any speech recognizer 10 known to those skilled in the art may be used within the scope of the invention.

d. The Integrator

Although the hypothesized output 40 from the speech recognizer 10 may be an approximation of a literal transcript of the recorded speech 30, further processing may be desired to refine the hypothesized output 40 for various uses. As shown in FIG. 2, one embodiment of the invention contains an integrator 14. In general, the integrator 14 integrates the hypothesized output 40 from the speech recognizer 10 with the partial transcript 20 to generate a semi-literal transcript 45 of the recorded speech 30. Different integrators 14 may be used to refine the hypothesized output 40 depending on the desired use of the semi-literal transcript 45. The word "integrate" will be used throughout this specification to refer to the act of generating a semi-literal transcript from a hypothesized output 40 and a partial transcript 20.

Figure 7:
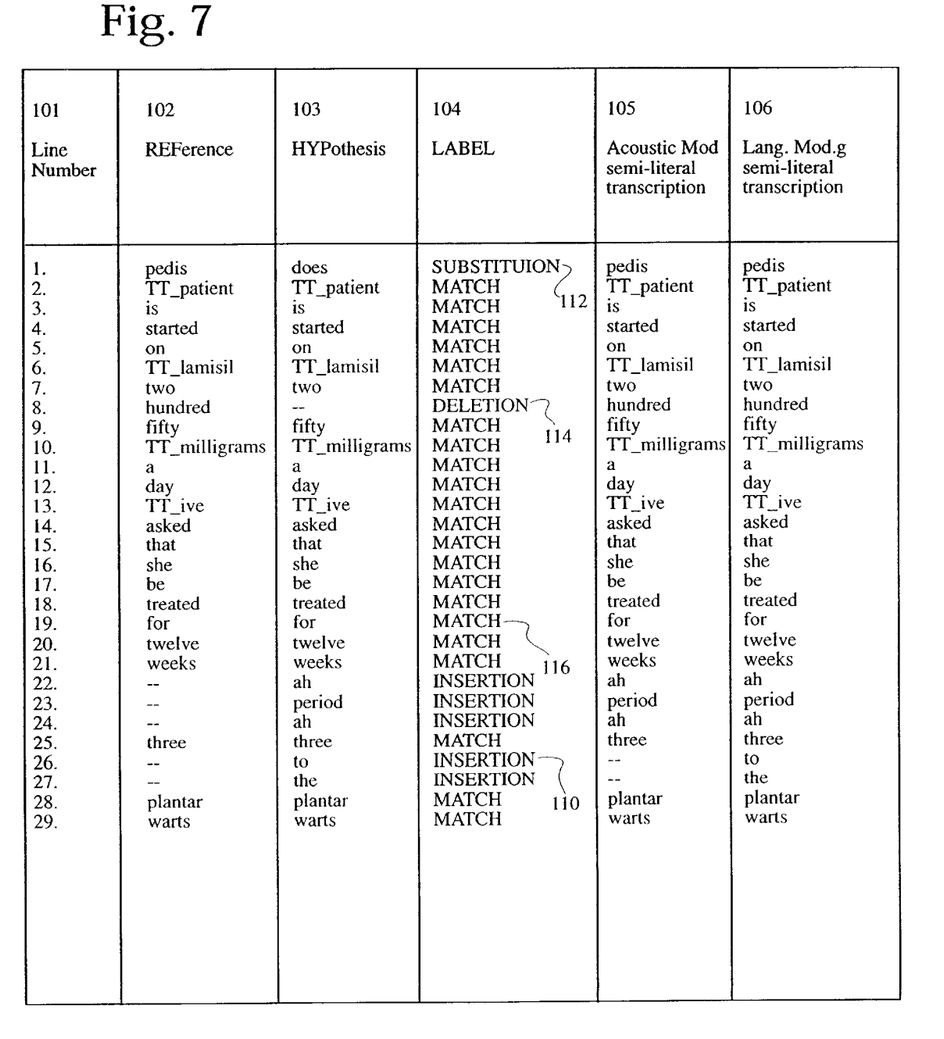
FIG. 7 is one example of an alignment of a hypothesized output and a partial transcript in accordance with one embodiment of the invention.
Figure 8:
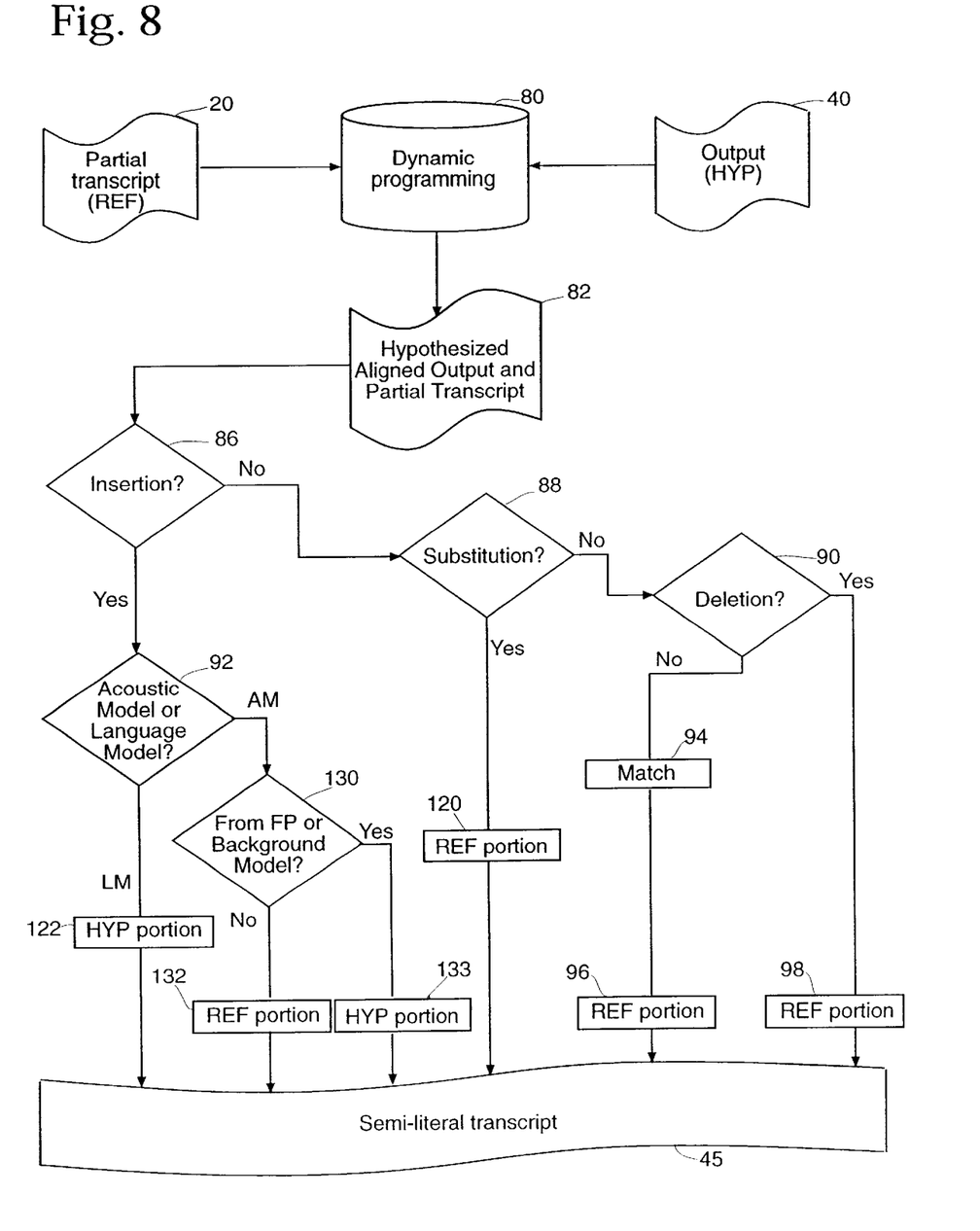
FIG. 8 is a flow chart showing the operation of the integrator of one embodiment of the invention.

FIGS. 7 and 8 illustrate one method in which the integrator 14 may function, with FIG. 8 depicting a flow diagram and FIG. 7 showing one example of the integration process. In the embodiment of FIG. 8, the partial transcript 20 and the hypothesized output 40 are input to a dynamic programing algorithm 80 that aligns 82 the hypothesized output 40 and the partial transcript 20 word for word (or by "line"). An example of the result is shown in FIG. 7, with 29 lines of words aligned. FIG. 7 contains six columns for the aligned transcripts 82: a line number 101, a column for the word from the partial transcript portion 102, a column for the corresponding aligned word from the hypothesized output portion 103, a label 104 for each line number, the output 105 to the semi-literal transcript 45 that may be used for acoustic modeling, and the output 106 to the semi-literal transcript 45 that may be used for language modeling.

In the example of FIG. 7, one of four possible values are assigned to the pairs of aligned words—substitution, deletion, insertion, or match. The integrator 14 may label those words, silences, and filled pauses (or line numbers for a pair of aligned words) that are present in the hypothesized output 40 but not in the partial transcript 20 with the label "insertion." In the example of FIG. 7, line number 26 is labeled as an "insertion" in column 104 because the word "to" is present in the hypothesized output 40 but not in the partial transcript 20. The integrator 14 may label those words that do align but do not match in spelling as "substitutions." In the example of FIG. 7, line number 1 is labeled as a "substitution" because the word "pedis" is found in the partial transcript 20 and the word "does" is found in the hypothesized output 40. The integrator 14 labels the words found in the partial transcript 20 but not the hypothesized output 40 as "deletions." Line number 8 in FIG. 7 is labeled as a "deletion" because the word "hundred" is in the partial transcript 20 and no word is in the hypothesized output 40. Finally, the words that align and match in spelling are labeled as "matches." Line number 19 in FIG. 7 is labeled as a "match" because the word "for" is found in the partial transcript 20 and the hypothesized output 40.

After the partial transcript 20 and hypothesized output 40 are aligned as set forth above, the integrator 14 determines which word to use in the semi-literal transcript 45—the word from the partial transcript 20 or the word from the hypothesized output 40. It should be noted that the desired output to the semi-literal transcript 45 may depend on whether the semi-literal transcript 45 will be used for acoustic modeling, language modeling, or for some other use. FIG. 7 depicts an embodiment where the output may be used for either acoustic modeling (column 105) or language modeling (column 106). In general, if a word in the hypothesized output 40 matches with the aligned word in the partial transcript 20, the words are the same and the word from either the hypothesized output 40 or the partial transcript 20 may be used in the semi-literal transcript 45. In line 19 of FIG. 7, for instance, the word "for" appears in both columns 105 and 106 because the label column 104 for line 19 is "match." FIG. 8 illustrates the partial transcript portion 96 being used in the semi-literal transcript 45 if the aligned words "match," as indicated by block 94.

If the aligned words of the hypothesized output 40 and the partial transcript 20 do not match, the integrator 14 must determine which word to use in the semi-literal transcript 45. In the embodiment of FIG. 8, the partial transcript portion 98, 120 is used for both acoustic modeling (column 105 of FIG. 7) and language modeling (column 106 of FIG. 7) if the label (column 104 of FIG. 7) is either a substitution 88 or a deletion 90. In one embodiment, therefore, the partial transcript portion 96, 98, 120 is used if the label is a match 94, deletion 90, or substitution 88. In another embodiment, the hypothesized output portion could, however, be used for deletions 90 or substitutions 88.

If the label is an insertion 86, the portion used for the semi-literal transcript 45 may vary depending upon whether the semi-literal transcript 45 will be used for acoustic modeling or language modeling, as depicted in FIG. 8 with numeral 92. If the semi-literal transcript 45 will be used for language modeling, it is generally desirable to use the hypothesized portion 122 for the semi-literal transcript 45, as depicted in FIG. 8. The hypothesized portion 122 may be used because an erroneous insertion is not as detrimental to language modeling adaptation as it is to acoustic modeling adaptation. In lines 22–24 and 26–27 in FIG. 7, therefore, the hypothesized portion (from column 103) is used in the semi-literal transcript 45 for language modeling (column 106). Thus, the filled pause or background words in lines 22–24 appear in the semi-literal transcript 45, as do the words "to" and "the" in lines 26–27, which may recognized by the speech recognizer 10 even though they are not present in the partial transcript 20. The phrase in lines 26–29 in FIG. 7, "to the plantar warts," is a plausible phrase in English even though it may not have been what was actually said or what the speaker meant to say.

If the semi-literal transcript 45 may be used for acoustic modeling, the aligned words labeled as insertions may be chosen depending upon whether the words came from the filled pause model 24 or the background model 26 (numeral 130 in FIG. 8). If the word in the hypothesized output 40 came from the filled pause model 24 or the background model 26, it is generally desirable to use those words for acoustic modeling, and therefore the hypothesized portion 133 is used in the semi-literal transcript 45. In FIG. 7, therefore, the words "ah", "period", and "ah" in lines 22–24 are used in the semi-literal transcript 45 for acoustic modeling as shown in column 105. The words "to" and "the" in lines 26–27 of FIG. 7, which were not inserted by the filled pause 24 or background models 26, are not used for acoustic modeling, and therefore the partial transcript portion 132 is used in column 105. These decisions may be made because it may be desirable to have the semi-literal transcript 45 be as close as possible to a literal transcript.

After a semi-literal transcript 45 has been generated in accordance with the description above, it may be used for acoustic or language modeling or for a variety of other applications as set forth below.

e. Partial Transcripts that Are Not Aligned with the Recorded Speech

One possible problem that may be encountered using the present invention for creating semi-literal transcripts 45 is that the actual speech in the recorded speech 30 may be out of sequence with the words in the partial transcript 20. For instance, a typical sequence for medical files that diagnose and set forth plans for patients is: subjective, objective, assessment, and plan. A given speaker may not dictate speech in this typical sequence, but a human transcriptionist may transcribe the words in the typical sequence. The partial transcript 20, therefore, may be substantially out of alignment with the recorded speech 30. In such a situation, the recorded speech 30 and the partial transcript 20 or augmented probabilistic finite state model 28 may be grossly out of alignment. There may, for instance, be long runs of "deletions" where a misplaced portion was spoken but not transcribed and there may be a long run of "insertions" where the transcribed speech is in the typical sequence but the words were not spoken in that sequence.

Figure 9:
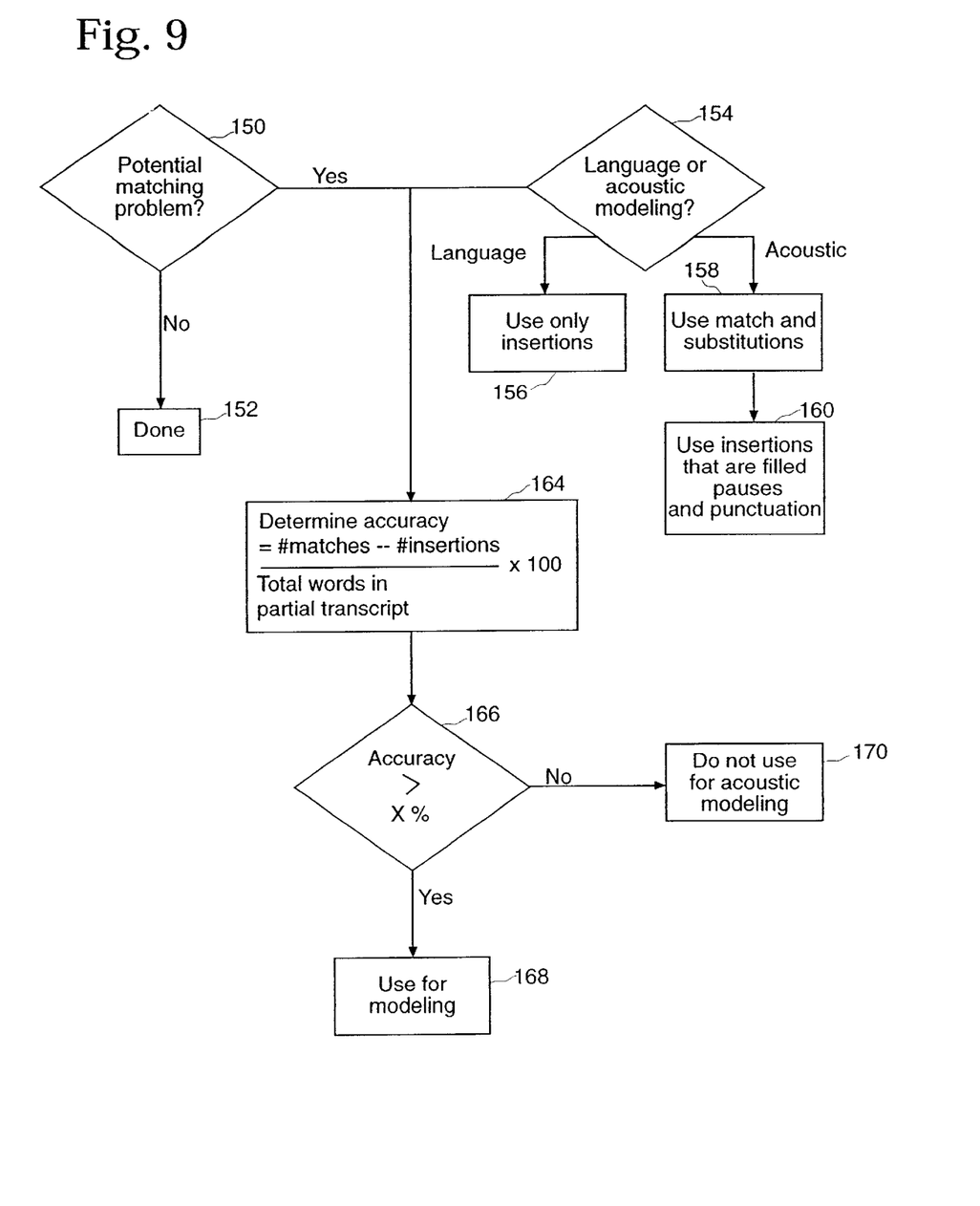
FIG. 9 is a flow chart showing one embodiment of a method of the invention for determining the use of a semi-literal transcript.

FIG. 9 depicts two embodiments of flow chart logic that may be used if recorded speech 30 is out of sequence with the partial transcript 20. If there is not a potential sequence problem 150 (as measured by any standard known to those skilled in the art), the problem may be ignored, as depicted by numeral 152 of FIG. 9.

If there is a potential sequence problem 150, FIG. 9 depicts two embodiments of solutions to the potential sequence problem. In the first embodiment, it is first determined whether the semi-literal transcript 45 will be used for language or acoustic modeling, as shown by numeral 154 in FIG. 9. If the semi-literal transcript 45 will be used for language modeling, in one embodiment, only the "insertions" (as shown in the example of FIG. 7) will be used (numeral 156 of FIG. 9). The "insertions" may be used because the sequence may not be crucial to language modeling.

The "insertions" may be used for language modeling because the order or sequence of sections, such as subjective, objective, assessment, and plan in a dictation, (also known as the discourse level order) is not crucial for language modeling. Sequence is not crucial for language modeling because, apart from the transitions between sections, the n-gram probabilities will remain unaffected by changes in the order of large portions of text, as alignment of spoken words in recorded speech with text is not crucial for language modeling. The sentence level order, which is crucial to language modeling, is largely independent of the changes in the order at the higher discourse level.

For acoustic modeling, however, the order is more important on a lower level—the sentence level order becomes less important whereas phoneme level order becomes more important. Thus, matching or aligning spoken words with transcribed words correctly and avoiding any mismatches may become important. If the semi-literal transcript 45 will be used for acoustic modeling, therefore, all "matches" and "substitutions" may be used in the semi-literal transcript 45 in one embodiment (numeral 158 of FIG. 9), because one can be reasonably sure that a match or a substitution will produce correct speech-text alignment. In addition, empirical knowledge of the speech recognizer's 10 performance may suggest using those "insertions" that correspond to filled pauses and punctuation in the semi-literal transcript 45 as well (numeral 160 in FIG. 9).

In the second embodiment shown in FIG. 9, decisions as to the use of semi-literal transcripts 45 for modeling may be made on the basis of the accuracy of the semi-literal transcript 45. Although accuracy may be measured in a variety of ways known to those skilled in the art, one calculation of accuracy is as follows:

$$\text{accuracy (in \%)} = \frac{100 * (\text{number of "matches"} - \text{number of "insertions"})}{(\text{total words in partial transcript})}.$$

After the accuracy has been determined, as shown by numeral 164 in FIG. 9, modeling decisions may be made by comparing the accuracy to a set accuracy level X, as shown by numeral 166 in FIG. 9. The accuracy level X may be any accuracy level, such as 60–90%, or a discrete value, such as 70%. The accuracy level X may, however, vary widely or be changed for varying speakers, contexts, or desired uses. If the actual accuracy is greater than or equal to the accuracy level X, the semi-literal transcript 45 may be used for acoustic and language modeling (numeral 168 in FIG. 9) as set forth in the other sections of this specification. If the actual accuracy is lower than the accuracy level X, the semi-literal transcript 45 may be used only for language modeling and not for acoustic modeling, as depicted by numeral 170 in FIG. 9.

f. Uses of Semi-Literal Transcripts

Figure 10:
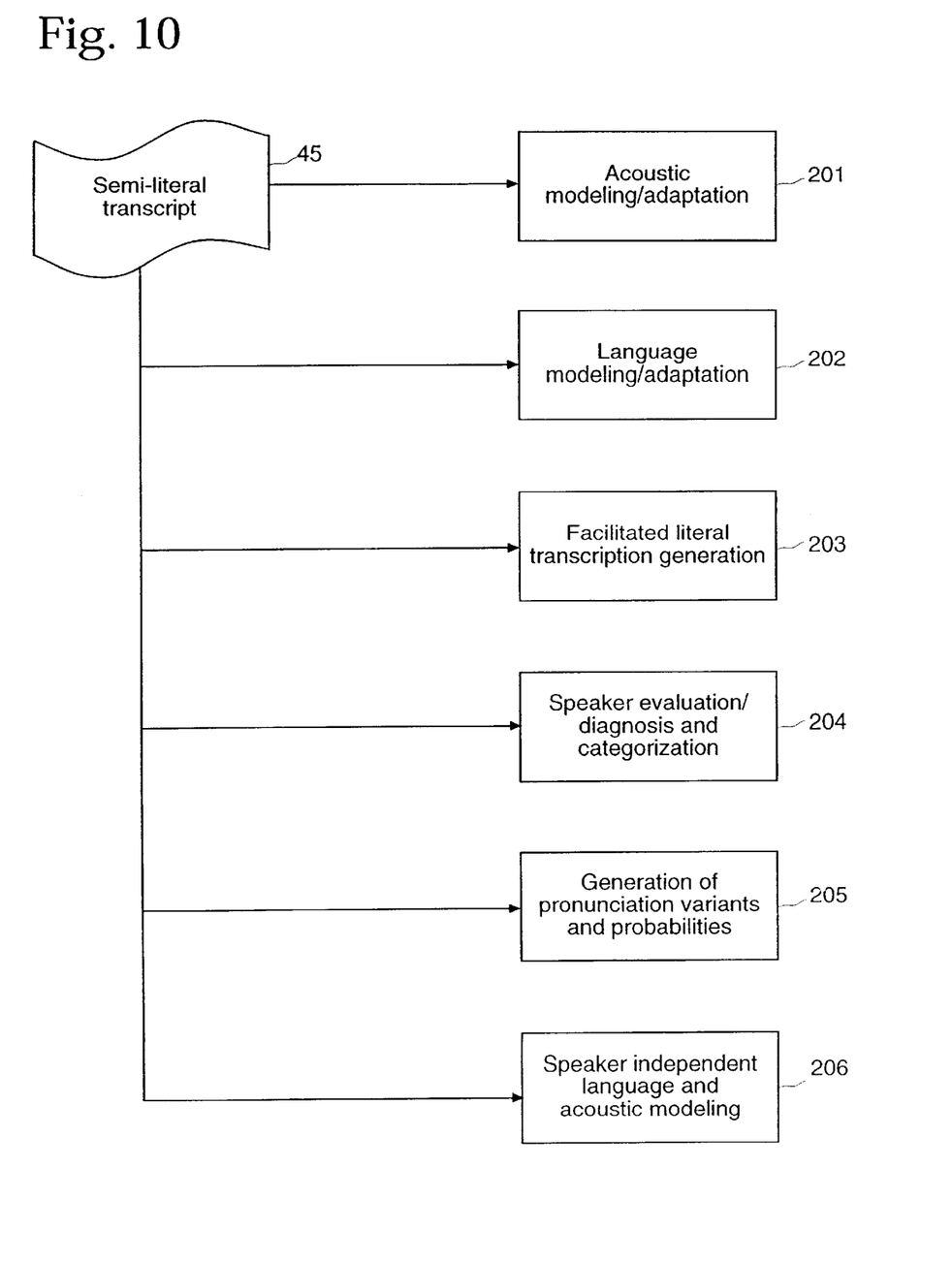
FIG. 10 is a block diagram showing a number of uses of a semi-literal transcript generated in accordance with one embodiment of the invention.

A semi-literal transcript 45 generated with the systems and methods of the invention may be used as a substitute for a literal transcript of the recorded speech wherever such a literal transcript may be used by those skilled in the art. FIG. 10 illustrates that a semi-literal transcript 45 may be used for a variety of applications in speech recognition or analysis, including acoustic modeling 201, language modeling 202, facilitated literal transcript generation 203, speaker evaluation and diagnosis 204, generation of pronunciation variants and probabilities 205, and speaker independent language and acoustic modeling 206. In addition, as explained in some detail above and in more detail below, the process used to generate the semi-literal transcript 45 may vary depending on the desired use of the semi-literal transcript.

In one embodiment, the semi-literal transcript 45 may be used for acoustic modeling or adaptation 201. In such an embodiment, the semi-literal transcript 45 may be used much like a literal transcript would be used in order to train the acoustic models 6 of the speech recognizer 10. Such training can be done for individual speakers, for different contexts (such as medical or legal dictations), or in order to train or adapt an acoustic model 6 for general use. As outlined above, the semi-literal transcript 45 may be built in a certain way if the desired use is for acoustic modeling 6. For the aligned words (as in FIG. 7) that are labeled as insertions, the hypothesized portion (column 103) is used in the semi-literal transcript 45 if the words correspond to filled pauses or background words. If the words that are labeled insertions are not filled pauses or background words, the partial transcript portion (column 102), which has no word entry, is used in the semi-literal transcript 45. If the aligned words are labeled substitutions or matches, the partial transcript portion (column 102) may be used in the semi-literal transcript 45. For those aligned words that are labeled deletions, the corresponding portion of the semi-literal transcript 45 and recorded speech 30 may be ignored (not used) for modeling purposes.

In another embodiment, the semi-literal transcript 45 may be used for language modeling or adaptation 202. In such an embodiment, the semi-literal transcript 45 may be used much like a literal transcript would be used in order to train the language models 8 of the speech recognizer 10, and the training may be done for individual speakers or for different contexts. As outlined above, the semi-literal transcript 45 may be built in a certain way if the desired use is for language modeling. For the aligned words (as in FIG. 7) that are labeled as insertions, the hypothesized portion (column 103) may be used in the semi-literal transcript 45. For aligned words labeled substitutions, deletions, or matches, the partial transcript portion (column 102) may be used in the semi-literal transcript 45.

In another embodiment, the semi-literal transcripts 45 may be used to facilitate literal transcript generation 203. To help human transcriptionists generate literal transcripts, the semi-literal transcripts 25 may be provided to the human transcriptionists along with the digitized speech stream of the recorded speech that corresponds to the semi-literal transcript 25. During speech playback the transcriptionist may be able to quickly edit the text of the semi-literal transcript 45 rather than having to completely retype or heavily edit the speech. The literal transcripts may then be used for any purpose known to those skilled in the art.

In yet another embodiment, the semi-literal transcripts 45 may be used for speaker evaluation and diagnosis 204 or for evaluation of the speech recognition system. For large-scale transcription applications using speech recognition, it may be important to evaluate the performance of the speech recognizer 10 on various speakers and to categorize the speakers according to their rate of speaking (i.e., words per minute) or level of fluency in the language, which may be, but need not be English. Because partial transcripts 20 do not contain filled pauses or background words, it may be difficult to compare the output of a speech recognizer 10 to a partial transcript 20 to diagnose the accuracy of the speech recognizer 10. Because the semi-literal transcript 45 may contain filled pauses and background words, it may be used to categorize speakers in a more meaningful way than by using the partial transcripts 20. For example, an audio file of recorded speech may be recognized using existing speaker-independent language and acoustic models, resulting in a baseline recognition hypothesis. This baseline recognition hypothesis can be compared to the semi-literal transcript 45 to evaluate performance of the speaker independent language and acoustic models.

In another embodiment of speaker evaluation and diagnosis 204, the semi-literal transcripts 45 for one individual speaker may be compared to the normal or baseline semi-literal transcripts 45 in order to determine if a speaker differs in fluency level from a typical speaker or if the speaker has a language deficiency.

In another embodiment, the semi-literal transcripts 45 may be used for generation of pronunciation variants and probabilities 205 that may be used to make speech recognizers 10 more accurate. Words such as "conduct" may be pronounced in different ways, and may have different meanings depending upon the pronunciations. Two possible pronunciations are: (1) /k ao n d ax k t/, where the first syllable is stressed; and (2) /k ax n d aa k t/, where the last syllable is stressed. These pronunciations, as well as others, may be generated using any known software that allows phoneme level alignment of speech. Because the semi-literal transcripts 45 developed in accordance with the present invention may contain a large amount of speech, such as background words and filled pauses, they may be used to further adapt the models of a speech recognizer 10 so that the models can determine which pronunciation of a given word, and hence which meaning, is likely within a given context. For example, pronunciation number 1 above for the word "conduct" may have a higher probability of occurring in a conversation about the behavior of high school students, whereas pronunciation number 2 above for "conduct" may have a higher probability of occurring in a conversation about physics, and more particularly electrical properties of materials. In addition to words with similar spellings but different pronunciations, this method may also be used for words with different spellings but the same pronunciations, such as "read" and "red." By using the semi-literal transcripts 45 in modeling for the speech recognizer 10, it may be possible to develop more particular language and acoustic models that may be able to determine word variations for distinct topics, speakers, or accents.

In yet another embodiment, the semi-literal transcripts 45 may be used for speaker independent language and acoustic modeling 206. In this embodiment, the semi-literal transcripts 45 may be used for language modeling and acoustic modeling on a speaker independent basis. In the description above, the semi-literal transcripts 45 would generally be used to adapt existing models with further data. In this embodiment, an acoustic model or a language model may be built entirely or almost entirely from data in the semi-literal transcripts 45 and recorded speech 30 for specific speakers. In another similar embodiment, the acoustic and language models may be built entirely or almost entirely from data in the semi-literal transcripts 45 and recorded speech 30 for specific contexts, such as the medical field, rather than for individual speakers.

g. Conclusion

In one embodiment of the invention, the invention takes a partial transcript 20 of recorded speech 30 and develops an augmented model 28 of the words in the partial transcript 20 using either a filled pause model 24 or a background model 26, or both a filled pause model 24 and a background model 26. Probabilities from the filled pause model 24 and background models 26 may be used to alter the transitional probabilities of the occurrence of a word after the current word in the partial transcript. The augmented model 28 may be used during speech recognition to assist in the generation of a hypothesized output 40 of the recorded speech 30 that, presumably, will contain at least some of the filled pauses and background words. This hypothesized output 40 may then be compared and integrated in several different ways with the partial transcript 20 to produce a semi-literal transcript 45 of the recorded speech 30. Such a semi-literal transcript 45, which may contain filled pauses and background words and should therefore be similar to a literal transcript 45 of the recorded speech 30, may then be used for any application in which a literal transcript 45 is commonly used. As set forth in the preceding sections of this specification, a variety of components may be used to perform the functions of the invention in a variety of ways known to those skilled in the art.

The method and apparatus of the invention described herein has a number of advantages over the prior art. The invention may allow for adaptation of the models for a speech recognizer 10 without having to generate literal transcripts of recorded speech 30. Instead, partial transcripts 20, which may be generated for commercial purposes anyway, may be augmented and used for modeling purposes. The use of partial transcripts 20 for the generation of semi-literal transcripts 45 may save significant amounts of time and money which may have been spent constructing literal transcripts in the absence of the invention. In addition to these benefits and advantages, the semi-literal transcripts 45 may have numerous other uses, as set forth in this specification. Other advantages and benefits of the invention may be known or will become apparent to those skilled in the art.

The accompanying Figures depict embodiments of the systems and methods of the present invention, and features and components thereof. With regard to references in this specification to computers, the computers may be any standard computer including standard attachments and components thereof (e.g., a disk drive, hard drive, CD player or network server that communicates with a CPU and main memory, a keyboard and mouse, and a monitor). The microprocessor of the CPU in the computer may be any conventional general purpose single- or multi-chip microprocessor such as a Pentium® processor, a Pentium® Pro processor, a 8051 processor, a MIPS® processor, a Power PC® processor, or an ALPHA® processor. In addition, the microprocessor may be any conventional special purpose microprocessor such as a digital signal processor or a graphics processor. The microprocessor may have conventional address lines, conventional data lines, and one or more conventional control lines. With regard to references to software or programs, the software or programs may be standard software or programs used by those skilled in the art or may be coded in any standard programming language to accomplish the tasks detailed above.

While the present invention has been described with reference to several embodiments thereof, those skilled in the art will recognize various changes that may be made without departing from the spirit and scope of the claimed invention. Accordingly, this invention is not limited to what is shown in the drawings and described in the specification but only as indicated in the appended claims.

What is claimed is:

1. A method for generating a semi-literal transcript from a partial transcript of recorded speech, comprising:
   (a) augmenting the partial transcript with words from one of a filled pause model and a background model to build an augmented probabilistic finite state model for the partial transcript;
   (b) inputting the recorded speech and the augmented probabilistic finite state model to a speech recognition system; and
   (c) generating a hypothesized output for the recorded speech using the speech recognition system, whereby the hypothesized output may be used as the semi-literal transcript.

2. The method of claim 1 further comprising integrating the hypothesized output with the partial transcript to generate the semi-literal transcript for the recorded speech.

3. The method of claim 1 wherein the act of augmenting comprises augmenting the partial transcript with words from the filled pause model.

4. The method of claim 1 wherein the act of augmenting comprises augmenting the partial transcript with words from the background model.

5. The method of claim 1 wherein the act of augmenting comprises assigning probabilities to the occurrence of words in the partial transcript.

6. The method of claim 2 wherein the act of integrating comprises aligning the words of the hypothesized output with the words of the partial transcript and determining which word to use in the semi-literal transcript if the words of the hypothesized output and the words of the partial transcript do not match.

7. The method of claim 6 wherein the act of aligning further comprises developing aligned pairs of words and labeling each aligned pair as one of a match, insertion, deletion, and substitution.

8. The method of claim 7 wherein the act of determining further comprises using a word in one of the hypothesized output and the partial transcript based on an intended use of the semi-literal transcript.

9. The method of claim 8 wherein the act of determining further comprises using a word from the hypothesized output for each aligned pair labeled as insertion if the intended use of the semi-literal transcript is for language modeling.

10. The method of claim 8 wherein the act of determining further comprises using a word from the hypothesized output for each aligned pair labeled as insertion if the intended use of the semi-literal transcript is for acoustic modeling and if the word in the hypothesized output is from one of the filled pause model and background model.

11. The method of claim 8 wherein the act of determining further comprises using a word from the partial transcript for each aligned pair labeled as insertion if the intended use of the semi-literal transcript is for acoustic modeling and if the word in the hypothesized output is not from one of the filled pause model and background model.

12. The method of claim 7 wherein the act of determining further comprises using a word from the partial transcript for each aligned pair labeled as one of match and deletion.

13. The method of claim 2 further comprising developing a pronunciation dictionary from the partial transcript for use in the speech recognition system.

14. The method of claim 2 further comprising building the filled pause model from a training corpus with filled pauses and a partial transcript without filled pauses.

15. The method of claim 2 further comprising building the background model using a literal transcript corpus and a partial transcript corpus.

16. A method for generating a semi-literal transcript from a partial transcript of recorded speech, comprising:
(a) augmenting the partial transcript with words from a filled pause model and a background model to build an augmented probabilistic finite state model for the partial transcript;
(b) inputting the recorded speech and the augmented probabilistic finite state model to a speech recognition system;
(c) generating a hypothesized output for the recorded speech using the speech recognition system; and
(d) integrating the hypothesized output with the partial transcript to generate a semi-literal transcript for the recorded speech.

17. The method of claim 16 wherein the act of integrating comprises aligning at least some of the words of the hypothesized output with the words of the partial transcript and determining which word to use in the semi-literal transcript if the words of the hypothesized output and the words of the partial transcript do not match.

18. The method of claim 16 further comprising using the semi-literal transcript as a substitute for a literal transcript of the recorded speech if an actual accuracy level of the semi-literal transcript is greater than a set accuracy level.

19. The method of claim 16 further comprising using only portions of the semi-literal transcript as a substitute for a literal transcript of the recorded speech depending upon whether the intended use of the semi-literal transcript is for one of language modeling and acoustic modeling.

20. A method for using a partial transcript in a speech recognition system, comprising:
(a) augmenting the partial transcript of recorded speech with words from a filled pause model and a background model to build an augmented probabilistic finite state model of the partial transcript;
(b) inputting the recorded speech and the augmented probabilistic finite state model to a speech recognition system;
(c) generating a hypothesized output for the recorded speech using the speech recognition system;
(d) integrating the hypothesized output with the partial transcript to generate a semi-literal transcript for the recorded speech; and
(e) using the semi-literal transcript as a substitute for a literal transcript of the recorded speech.

21. The method of claim 20 wherein the act of augmenting a partial transcript comprises assigning probabilities to the occurrence of filled pause words, background words, and tokenized words after a given tokenized word in the partial transcript.

22. The method of claim 21 wherein the act of generating a hypothesized output comprises using the speech recognition system to compare sounds of words in the recorded speech to the probabilities of the occurrence of words in the augmented probabilistic finite state model to build the hypothesized output.

23. The method of claim 20 wherein the act of using the semi-literal transcript comprises using the semi-literal transcript for language modeling.

24. The method of claim 20 wherein the act of using the semi-literal transcript comprises using the semi-literal transcript for acoustic modeling.

25. The method of claim 20 wherein the act of using the semi-literal transcript comprises using the semi-literal transcript for facilitated literal transcript generation.

26. The method of claim 20 wherein the act of using the semi-literal transcript comprises using the semi-literal transcript for speaker evaluation and diagnosis.

27. The method of claim 20 wherein the act of using the semi-literal transcript comprises using the semi-literal transcript for generation of pronunciation variants and probabilities.

28. A method for using a partial transcript of recorded speech, comprising:
(a) producing a semi-literal transcript from a partial transcript augmented with words from one of a filled pause model and a background model so as to form an augmented probabilistic finite state model of the partial transcript; and
(b) using the semi-literal transcript as a substitute for a literal transcript of the recorded speech.

29. The method of claim 28 wherein the act of using the semi-literal transcript comprises using the semi-literal transcript for language modeling.

30. The method of claim 28 wherein the act of using the semi-literal transcript comprises using the semi-literal transcript for acoustic modeling.

31. The method of claim 28 wherein the act of using the semi-literal transcript comprises using the semi-literal transcript for facilitated literal transcript generation.

32. The method of claim 28 wherein the act of using the semi-literal transcript comprises using the semi-literal transcript for speaker evaluation and diagnosis.

33. The method of claim 28 wherein the act of using the semi-literal transcript comprises using the semi-literal transcript for generation of pronunciation variants and probabilities.

34. An apparatus for generating a semi-literal transcript from a partial transcript of recorded speech, the apparatus comprising:
(a) an interpolator containing programs for augmenting the partial transcript with words from one of a filled pause model and a background model to build an augmented probabilistic finite state model of the partial transcript;
(b) a speech recognizer containing programs for generating a hypothesized output for the recorded speech using the augmented probabilistic finite state model and the recorded speech as inputs; and
(c) an integrator containing instructions for integrating the hypothesized output with the partial transcript to generate a semi-literal transcript of the recorded speech.

* * * * *